(12) United States Patent
White

(10) Patent No.: US 9,789,796 B1
(45) Date of Patent: Oct. 17, 2017

(54) SEAT WITH A CYLINDRICAL VENTILATION FAN

(71) Applicant: GM GLOBAL TECHNOLOGY OPERATIONS LLC, Detroit, MI (US)

(72) Inventor: Brennon L. White, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/097,426

(22) Filed: Apr. 13, 2016

(51) Int. Cl.
*A47C 7/74* (2006.01)
*B60N 2/56* (2006.01)
*B60N 2/68* (2006.01)

(52) U.S. Cl.
CPC ............. *B60N 2/5657* (2013.01); *B60N 2/68* (2013.01)

(58) Field of Classification Search
CPC ................................ B60N 2/5657; B60N 2/68
USPC .... 297/180.1–180.15, 216.1, 216.13–216.16
See application file for complete search history.

(56) References Cited

U.S. PATENT DOCUMENTS

| | | | | |
|---|---|---|---|---|
| 4,685,727 A * | 8/1987 | Cremer | ................... | A47C 7/74 297/180.14 |
| 5,382,075 A * | 1/1995 | Shih | ................ | A47C 7/74 297/180.14 X |
| 6,019,420 A * | 2/2000 | Faust | ................... | B60N 2/5635 297/180.14 |
| 6,206,465 B1 * | 3/2001 | Faust | ..................... | A47C 7/74 297/180.14 X |
| 6,224,150 B1 * | 5/2001 | Eksin | ................... | B60N 2/5635 297/180.13 X |
| 6,869,140 B2 * | 3/2005 | White | ................. | B60N 2/5635 297/180.13 |
| 7,607,730 B2 * | 10/2009 | Moseneder | .............. | A47C 5/06 297/216.1 |
| 7,828,050 B2 * | 11/2010 | Esaki | ................ | B60H 1/00285 297/180.14 X |
| 9,456,702 B2 * | 10/2016 | Miyata | ................... | A47C 27/14 |
| 2003/0102699 A1 * | 6/2003 | Aoki | ................ | B60H 1/00285 297/180.14 |
| 2006/0138812 A1 * | 6/2006 | Aoki | .................... | B60N 2/5635 297/180.14 |
| 2006/0290176 A1 * | 12/2006 | Aoki | .................... | B60N 2/5628 297/180.13 X |
| 2007/0063551 A1 * | 3/2007 | Gasic | .................... | B60N 2/5685 297/180.1 |
| 2008/0129090 A1 * | 6/2008 | Zeyen | ................. | B60N 2/5671 297/180.14 |
| 2009/0134675 A1 * | 5/2009 | Pfahler | ............... | B60N 2/5635 297/180.1 |

(Continued)

*Primary Examiner* — Rodney B White
(74) *Attorney, Agent, or Firm* — Quinn IP Law

(57) ABSTRACT

A ventilated seat having a jounce zone, including a seat jounce zone and a back jounce zone, configured to deform when the ventilated seat and an occupant are subjected to a dynamic force includes a frame, a seat portion, a back portion, and a cylindrical blower. The seat portion is connected to the frame and has a porous seat cover portion and the seat jounce zone. The back portion is connected to the frame and has a porous back cover portion and the back jounce zone. The cylindrical blower is attached to the frame, is disposed at least partially outside of the jounce zone, and is operatively connected to one of the porous seat cover portion and the porous back cover portion such that air flows through the respective porous cover portion to provide ventilation to the ventilated seat.

17 Claims, 6 Drawing Sheets

(56) References Cited

U.S. PATENT DOCUMENTS

| | | | | |
|---|---|---|---|---|
| 2009/0243350 A1* | 10/2009 | Nishide | .................. | B60N 2/002 297/180.1 |
| 2011/0133525 A1* | 6/2011 | Oota | .................... | B60N 2/5635 297/180.14 |
| 2012/0032478 A1* | 2/2012 | Friderich | ............... | B60N 2/448 297/180.1 |
| 2013/0119715 A1* | 5/2013 | Medoro | ................. | B60N 2/686 297/180.1 |
| 2014/0203599 A1* | 7/2014 | Line | .................... | B60N 2/5642 297/180.14 |
| 2015/0251580 A1* | 9/2015 | Sachs | .................. | A61H 9/0078 297/180.13 |
| 2015/0274049 A1* | 10/2015 | Langensiepen | ...... | B60N 2/5628 297/180.14 X |
| 2015/0329028 A1* | 11/2015 | Ogino | ................. | B60N 2/5635 297/180.14 |
| 2016/0052432 A1* | 2/2016 | Lafferty | ............... | B60N 2/5685 297/180.12 |

* cited by examiner

SEAT WITH A CYLINDRICAL VENTILATION FAN

TECHNICAL FIELD

This disclosure relates to a seat with a cylindrical ventilation fan.

BACKGROUND

A vehicle typically includes a seat. The seat may include a ventilation fan or blower for circulating air to cool an occupant of the seat.

SUMMARY

A ventilated seat and a vehicle are provided herein. The ventilated seat has a jounce zone, including a seat jounce zone and a back jounce zone, configured to deform when the ventilated seat and an occupant are subjected to a dynamic force. The ventilated seat includes a frame, a seat portion, a back portion, and a cylindrical fan or blower. The seat portion is connected to the frame and has a porous seat cover portion and the seat jounce zone configured to deform when subjected to the dynamic force. The back portion is connected to the frame and has a porous back cover portion and the back jounce zone configured to deform when subjected to the dynamic force. The cylindrical blower is attached to the frame, is disposed at least partially outside of the jounce zone, and is operatively connected to one of the porous seat cover portion and the porous back cover portion such that air flows through the respective porous cover portion to provide ventilation to the ventilated seat.

The vehicle is subjectable to a dynamic force and includes a body and a ventilated seat. The ventilated seat has a jounce zone, including a seat jounce zone and a back jounce zone, configured to deform when an occupant is in the ventilated seat and the vehicle is subjected to the dynamic force. The ventilated seat is operatively connected to the body. The ventilated seat includes a frame, a seat portion, a back portion, and a cylindrical fan or blower. The seat portion is connected to the frame and has a porous seat cover portion and the seat jounce zone configured to deform when subjected to the dynamic force. The back portion is connected to the frame and has a porous back cover portion and the back jounce zone configured to deform when subjected to the dynamic force. The cylindrical blower is attached to the frame, is disposed at least partially outside of the jounce zone, and is operatively connected to one of the porous seat cover portion and the porous back cover portion such that air flows through the respective porous cover portion to provide ventilation to the ventilated seat.

The ventilated seat and the vehicle disclosed herein allow the ventilation fan or blower to be located at least partially outside of the jounce zone of the ventilated seat. This disclosure applies to any machine or manufacture having a ventilated seat for an occupant, operator, or rider and subject to a dynamic force. This disclosure applies to any vehicle or mobile platform, including but not limited to cars, trucks, vans, all-terrain vehicles, busses, boats, trains, manufacturing vehicles and equipment, agricultural vehicles and equipment, construction vehicles and equipment, maintenance vehicles and equipment, and military vehicles and equipment.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
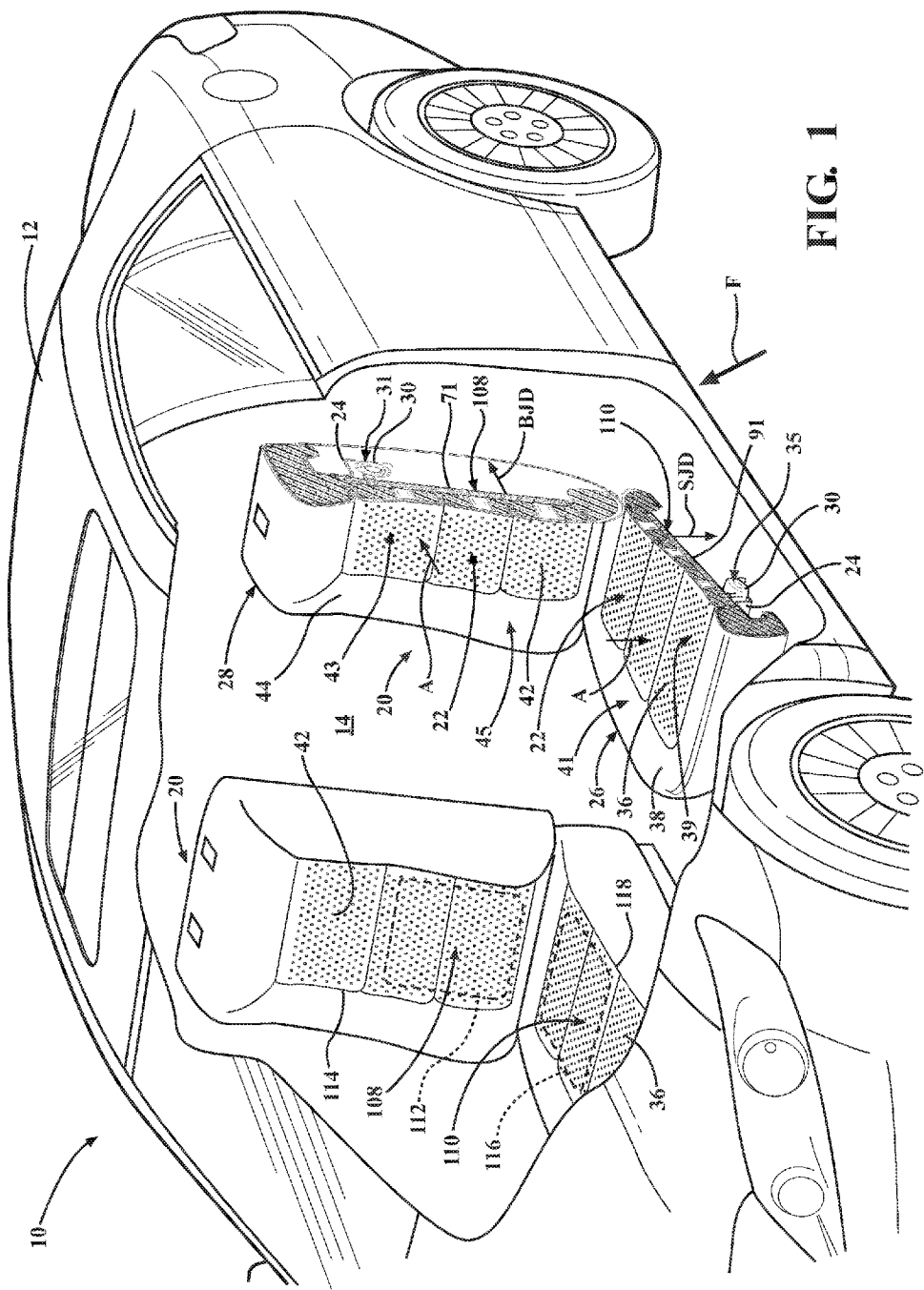
FIG. 1 is a fragmentary, schematic, perspective illustration of a vehicle having a ventilated seat with a cylindrical blower.

Referring to the drawings, wherein like reference numbers refer to like components throughout the views, FIG. 1 shows an example vehicle 10. The vehicle 10 is subjectable to a dynamic vehicle force (arrow F) and includes a body 12 that forms an interior 14 of the vehicle 10. The vehicle 10 includes a ventilated seat 20 for an occupant (not shown) of the vehicle 10 of the type disclosed herein.

While the vehicle 10 of FIG. 1 is a typical example application suitable for the ventilated seat 20 disclosed herein, the present disclosure is not limited to vehicular applications. Any machine or manufacture having a ventilated seat for an occupant, an operator, or a rider and subject to dynamic forces may benefit from use of the present design, when properly scaled and configured for the particular application. For illustrative consistency, the vehicle 10 will be described hereinafter as an example system without limiting use of the ventilated seat 20 to such an embodiment.

The ventilated seat 20 has a jounce zone 22 configured to deform when the occupant is in the ventilated seat 20 and the vehicle 10 is subjected to the dynamic force (arrow F). The dynamic force (arrow F) may result from operation of the vehicle 10. For example, the dynamic force (arrow F) may result from acceleration, braking, and maneuvering or turning of the vehicle 10. The dynamic force (arrow F) may result from road or ground conditions, such as bumps, pot holes, inclines, declines, cobble stones, ice, debris, etc. as the vehicle 10 travels over the road or ground. The dynamic force (arrow F) causes an acceleration (not shown) that acts on both the occupant and the ventilated seat 20 and causes the occupant to deform the jounce zone 22 when the occupant is in the ventilated seat 20 and the vehicle 10 is subjected to the dynamic force (arrow F).

The jounce zone 22 is the portion of the ventilated seat 20 that is configured to deform when the occupant is in the ventilated seat 20 and the vehicle 10 is subjected to the dynamic force (arrow F). The jounce zone 22 may also be configured to deform when the occupant moves in or presses on the ventilated seat 20. The jounce zone 22 includes a seat jounce zone 110 and a back jounce zone 108. A surface 71 of the back portion 28 in the back jounce zone 108 may deform rearward, in a back jounce zone deformation direction (arrow BJD) during the dynamic force (arrow F). A surface 91 of the seat portion 26 in the seat jounce zone 110 may deform downward, in a seat jounce zone deformation direction (arrow SJD) during the dynamic force (arrow F). The jounce zone 22 will be discussed in greater detail below.

The ventilated seat 20 is operatively connected to the body 12 of the vehicle 10. For example, the ventilated seat 20 may be powered or manually translatable forward or rearward relative to the body 12 of the vehicle 10 as desired by the occupant of the ventilated seat 20. Other powered or manual movements or adjustments of the ventilated seat 20 relative to the body 12 of the vehicle 10 may be included in the operative connection of the ventilated seat 20 to the body 12 of the vehicle 10, as appropriate.

Figure 3:
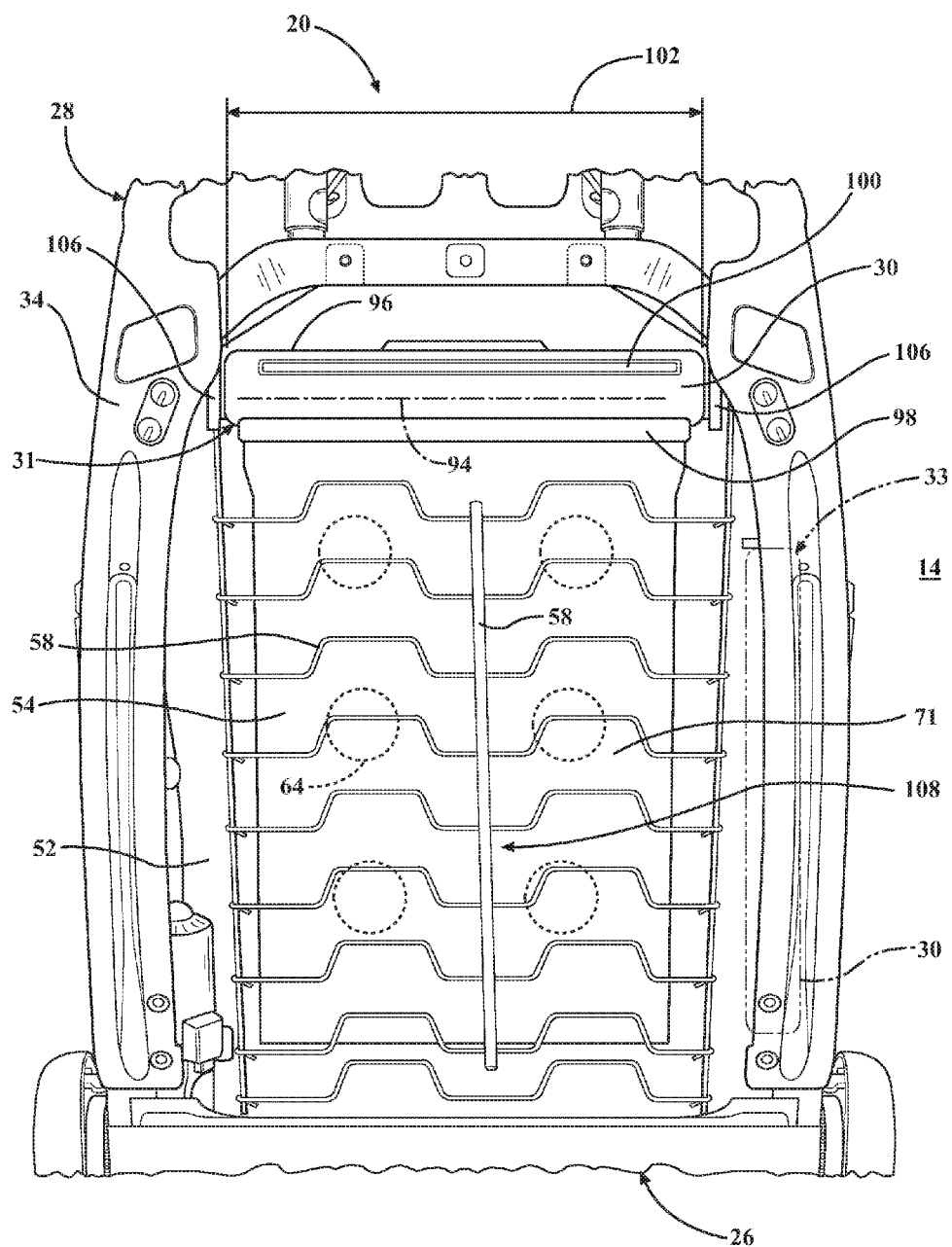
FIG. 3 is a schematic illustration of the back portion of the ventilated seat of FIG. 1, viewed from behind, with a rear panel of the back portion removed and showing the cylindrical blower in two alternative positions.
Figure 4:
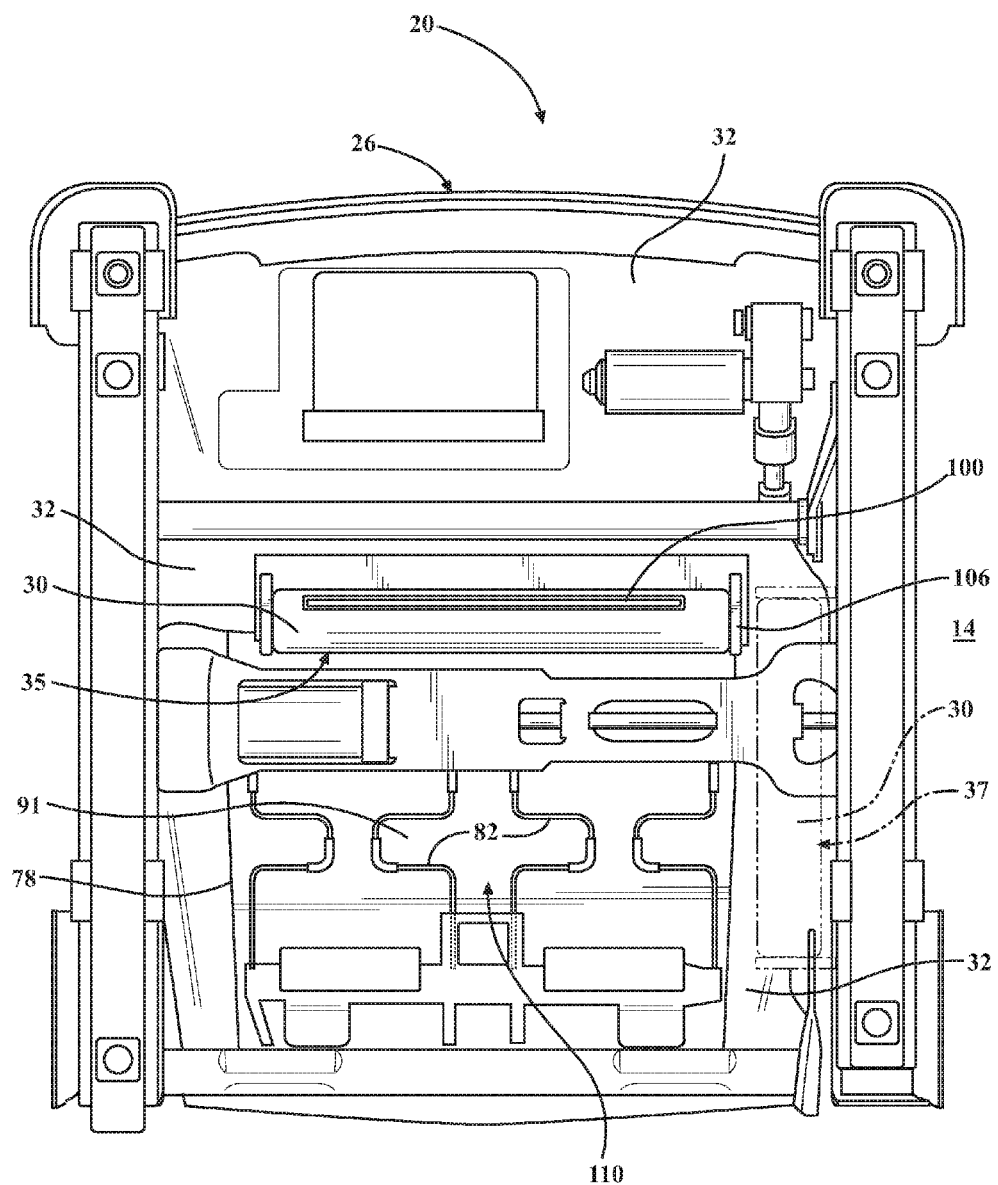
FIG. 4 is a schematic illustration of a seat portion of the ventilated seat of FIG. 1, viewed from below, showing the cylindrical blower in two additional alternative positions.

Referring now to FIGS. 1, 3 and 4, the ventilated seat 10 includes a frame 24, a seat portion 26, a back portion 28, and a cylindrical blower 30. The frame 24 may be made of a metal or of any other structural material. The frame 24 may include a seat frame portion 32 and a back frame portion 34, as best seen in FIGS. 3 and 4. The back frame portion 34 may be operatively connected to the seat frame portion 32 such that the back portion 28 of the ventilated seat 20 may be folded or inclined relative to the seat portion 26 of the ventilated seat 20 as desired by the occupant of the ventilated seat 20. Other manual or powered movements or adjustments of the seat portion 26 and the back portion 28 of the ventilated seat 20 may be included, as appropriate.

Referring now to FIGS. 1 and 4-6, the seat portion 26 of the ventilated seat 20 is connected to the seat frame portion 32 of the frame 24. The seat portion 26 has a porous seat cover portion 36 and may have a nonporous seat cover portion 38. The porous seat cover portion 36 may cover at least the part of the seat portion 26 that contacts the occupant when the occupant is in the ventilated seat 20. The porous seat cover portion 36 may be located in a seat insert portion 39 of the ventilated seat 20, as understood by those having skill in the art. The nonporous seat cover portion 38 may cover all or part of the remainder of the seat portion 26. The nonporous seat cover portion 38 may be located in a seat bolster portion 41 of the ventilated seat 20, as understood by those having skill in the art.

Figure 5:
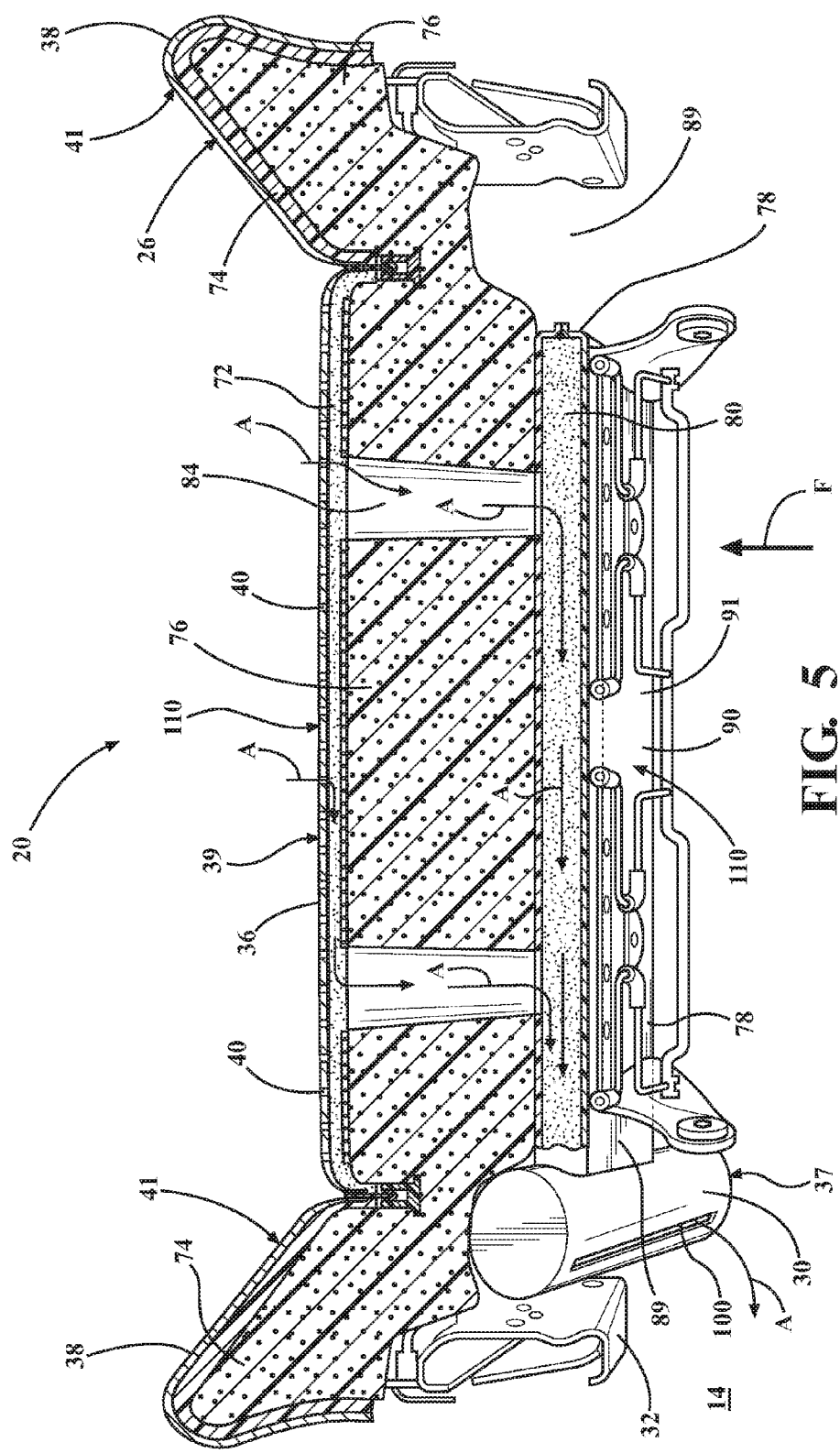
FIG. 5 is a schematic, cross-sectional illustration, partially in elevation, of the seat portion of the ventilated seat of FIG. 1, viewed from the front, showing the cylindrical blower in one alternative position.
Figure 6:
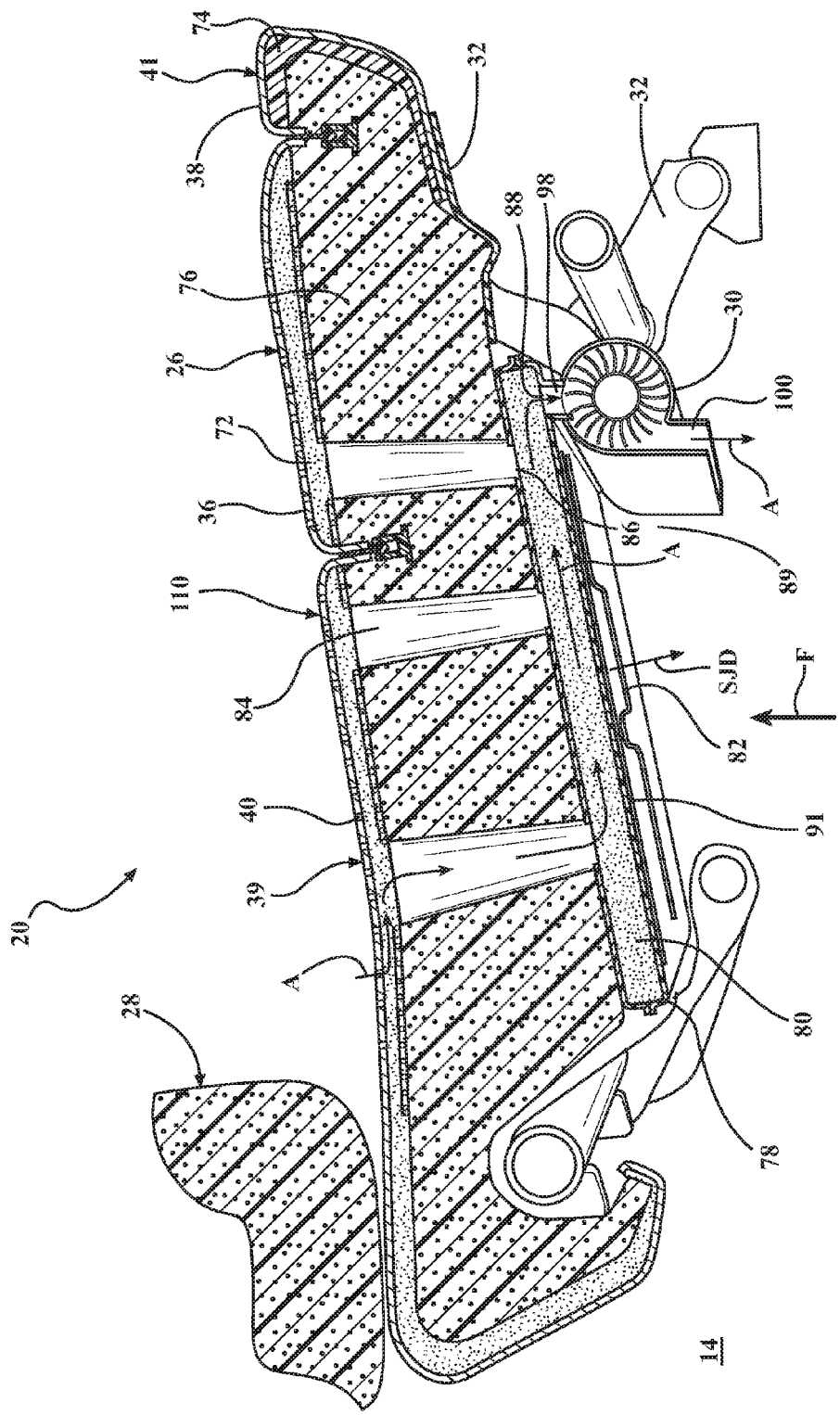
FIG. 6 is a schematic, cross-sectional illustration, partially in elevation, of the seat portion of the ventilated seat of FIG. 1, viewed from the side, showing the cylindrical blower in another alternative position.

The porous seat cover portion 36 may be configured with seat ventilation holes 40 that allow an air flow (arrow A) to pass through the porous seat cover portion 36. Alternatively, the porous seat cover portion 36 may be made of a porous material that allows the air flow (arrow A) to pass through the porous seat cover portion 36. The air flow (arrow A) may be from the interior 14 of the vehicle 10 into the porous seat cover portion 36 of the seat portion 26, as shown in FIGS. 1, 5, and 6. Alternatively, the air flow (arrow A) may be out of the porous seat cover portion 36 of the seat portion 26 into the interior 14 of the vehicle 10, i.e., in the opposite direction of the air flow (arrow A) shown in FIGS. 1, 5, and 6. The seat portion 26 is configured to deform when the occupant is in the ventilated seat 20.

Figure 2:
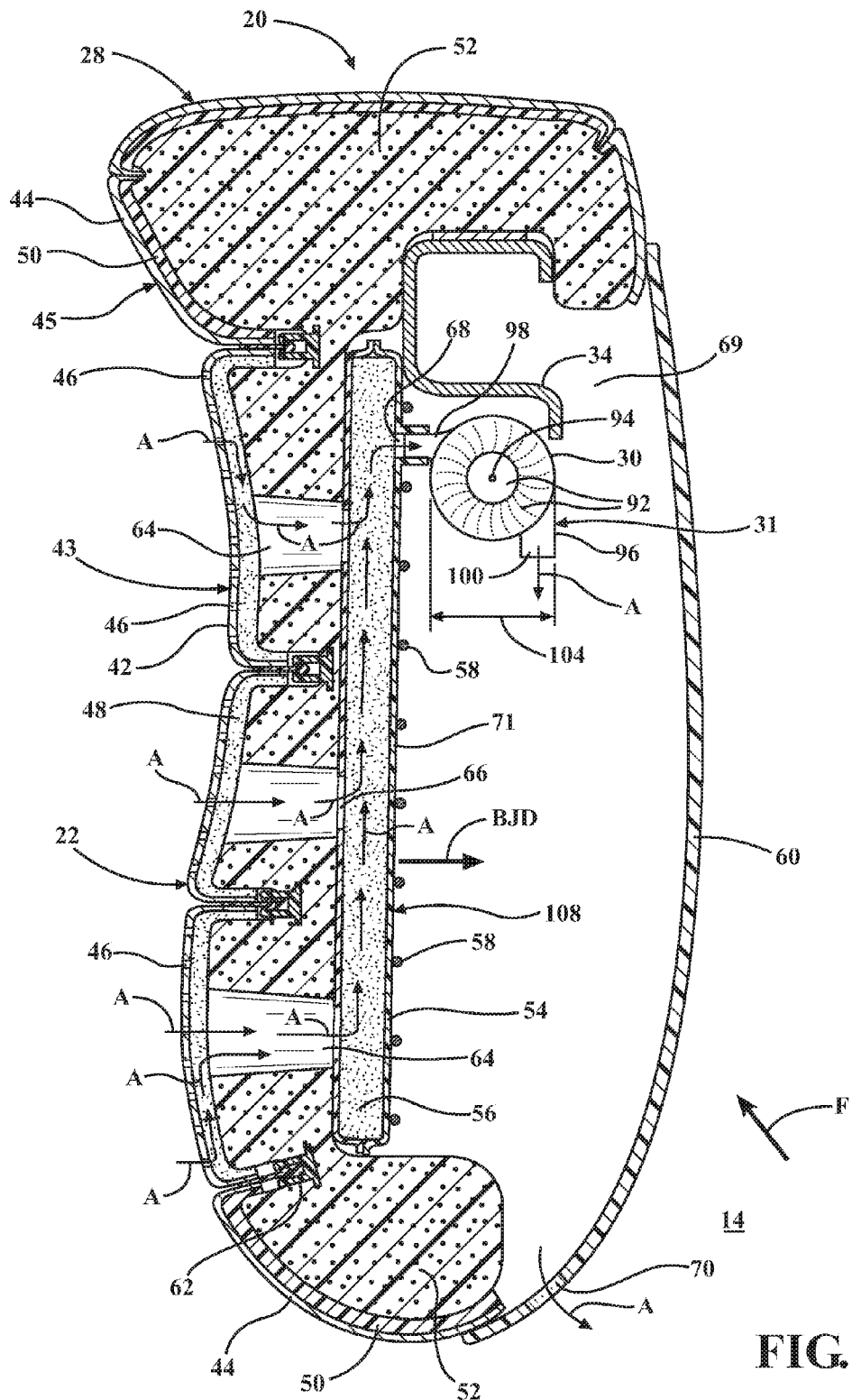
FIG. 2 is a schematic, cross-sectional illustration of a back portion of the ventilated seat of FIG. 1, viewed from the side.

Referring now to FIGS. 1-3, the back portion 28 of the ventilated seat 20 is connected to the back frame portion 34 of the frame 24. The back portion 28 has a porous back cover portion 42 and may have a nonporous back cover portion 44. The porous back cover portion 42 may cover at least the part of the back portion 28 that contacts the occupant when the occupant is in the ventilated seat 20. The porous back cover portion 42 may be located in a back insert portion 43 of the ventilated seat 20, as understood by those having skill in the art. The nonporous back cover portion 44 may cover all or part of the remainder of the back portion 28. The nonporous back cover portion 44 may be located in a back bolster portion 45 of the ventilated seat 20, as understood by those having skill in the art.

The porous back cover portion 42 may be configured with back ventilation holes 46 that allow the air flow (arrow A) to pass through the porous back cover portion 42. Alternatively, the porous back cover portion 44 may be made of a porous material that allows the air flow (arrow A) to pass through the porous seat back cover portion 42. The back portion 28 is configured to deform when the occupant is in the ventilated seat. The air flow (arrow A) may be from the interior 14 of the vehicle 10 into the porous back cover portion 42 of the back portion 28, as shown in FIGS. 1 and 2. Alternatively, the air flow (arrow A) may be out of the porous back cover portion 42 of the back portion 28 into the interior 14 of the vehicle 10, i.e., in the opposite direction of the air flow (arrow A) shown in FIGS. 1 and 2. The seat portion 26 is configured to deform when the occupant is in the ventilated seat 20.

Referring now to FIGS. 2-3, the back portion 28 of the ventilated seat 20 may include a 3D spacer knit or reticulated foam layer 48, a pad layer 50, a foam portion 52, a vent bag or plenum 54, a 3D spacer knit or reticulated foam filling 56 disposed inside of the plenum 54, a lumbar or back suspension 58, and a back panel 60. The reticulated foam layer 48 may be made of a porous material and may be disposed between the porous back cover portion 44 and the foam portion 52. The reticulated foam layer 48 may allow the air flow (arrow A) to pass through. The pad layer 50 may be disposed between the nonporous back cover portion 44 and the foam portion 52. The porous back cover portion 42, the nonporous back cover portion 44, the reticulated foam layer 48 and the pad layer 50 may be connected to the foam portion 52 via a trim tie down or trim fastener 62.

The foam portion 52 may be connected to the back frame portion 34 of the frame 24 and may form a pass-through hole or channel 64 configured to allow the air flow (arrow A) to pass through the foam portion 52. The plenum 54 may be made of a flexible, nonporous material and may form a plenum opening 66 configured to allow the air flow (arrow A) to pass between the channel 64 of the foam portion 52 and the reticulated foam filling 56 disposed inside of the plenum 54. The reticulated foam filling 56 may be made of a porous material and may allow the air flow (arrow A) to pass through the reticulated foam filling 56 inside of the plenum 54. The plenum 54 may also form a blower opening 68 configured to connect to the cylindrical blower 30 and to allow the air flow (arrow A) to pass between the reticulated foam filling 56 inside of the plenum 54 and the cylindrical blower 30. The blower opening 68 may be configured as a channel, extending toward the cylindrical blower 30, as shown.

The lumbar or back suspension 58 may be attached to the back frame portion 34 of the frame 24 and may be configured to support the plenum 54, the foam portion 52, the reticulated foam layer 48, the pad layer 50, the porous back cover portion 42, and the nonporous back cover portion 44 of the ventilated seat 20. The back suspension 58 may be configured to move relative to the back frame portion 34 of the frame 24 when the jounce zone 22 deforms. The plenum 54 may be disposed between the foam portion 52 and the back suspension 58, as shown. Alternatively, the plenum 54 may be disposed between the reticulated foam layer 48 and the foam portion 52. The back portion 28 of the ventilated seat 20 may form a cavity 69. The cavity 69 may be at least partially outside of the jounce zone 22. The back panel 60 may be attached to the back frame portion 34 of the frame 24 and may form a vent opening 70 configured to allow the air flow (arrow A) to pass between the cavity 69 of the back portion 28 of the ventilated seat 20 and the interior 14 of the vehicle 10. The back portion 28 of the ventilated seat 20 may include the surface 71. The surface 71 may be formed by the plenum 54 and the back suspension 58, as shown.

Referring now to FIGS. 4-6, similar to the back portion 28 of the ventilated seat 20, the seat portion 26 of the ventilated seat 20 may include a 3D spacer knit or reticulated foam layer 72, a pad layer 74, a foam portion 76, a vent bag or plenum 78, a 3D spacer knit or reticulated foam filling 80 disposed inside of the plenum 78, and a seat suspension 82. The reticulated foam layer 72 may be made of a porous material and may be disposed between the porous seat cover portion 36 and the foam portion 76. The reticulated foam layer 72 may allow the air flow (arrow A) to pass through. The pad layer 74 may be disposed between the nonporous seat cover portion 38 and the foam portion 76. The porous seat cover portion 36, the nonporous seat cover portion 38, the reticulated foam layer 72, and the pad layer 74 may be connected to the foam portion 76 via the trim tie down or trim fastener 62.

The foam portion 76 may be connected to the seat frame portion 32 of the frame 24 and may form a pass through hole or channel 84 configured to allow the air flow (arrow A) to pass through the foam portion 76. The plenum 78 may be made of a flexible, nonporous material and may form a plenum opening 86 configured to allow the air flow (arrow A) to pass between the channel 84 of the foam portion 76 and the reticulated foam filling 80 disposed inside of the plenum 78. The reticulated foam filling 80 may be made of a porous material and may allow the air flow (arrow A) to pass through the reticulated foam filling 80 inside of the plenum 78. The plenum 78 may also form a blower opening 88 configured to connect to the cylindrical blower 30 and to allow the air flow (arrow A) to pass between the reticulated foam filling 80 inside of the plenum 78 and the cylindrical blower 30. The blower opening 88 may be configured as a channel, extending toward the cylindrical blower 30, as shown.

The seat suspension 82 may be attached to the seat frame portion 32 of the frame 24 and may be configured to support the plenum 78, the foam portion 76, the reticulated foam layer 72, the pad layer 74, the porous seat cover portion 36, and the nonporous seat cover portion 38 of the ventilated seat 20. The seat suspension 82 may be configured to move relative to the seat frame portion 32 of the frame 24 when the jounce zone 22 deforms. The plenum 78 may be disposed between the foam portion 76 and the seat suspension 82, as shown. Alternatively, the plenum 78 may be disposed between the reticulated foam layer 72 and the foam portion 76. The seat portion 26 of the ventilated seat 20 may form a cavity 89. The cavity 89 may be at least partially outside of the jounce zone 22. The seat portion 26 of the ventilated seat 20 may have an open bottom 90 allowing the air flow (arrow A) to pass between seat portion 26 of the ventilated seat 20 and the interior 14 of the vehicle 10. The seat portion 26 of the ventilated seat 20 may include the surface 91. The surface 91 may be formed by the plenum 78 and the seat suspension 82, as shown.

Referring now to FIGS. 1-6, the cylindrical blower 30 is attached to the frame 24 of the ventilated seat 20. The cylindrical blower 30 may be attached to one of the back frame portion 34 and the seat frame portion 32 of the frame 24. The cylindrical blower 30 is operatively connected to one of the porous seat cover portion 36 and the porous back cover portion 42 such that air flows through the respective porous cover portion 36, 42 to provide ventilation for the occupant of the ventilated seat 20. The cylindrical blower 30 may not be attached to the seat suspension 82 or the back suspension 58 of the ventilated seat 20. The cylindrical blower 30 may attached to the frame 24 via an isolator 106.

The jounce zone 22 of the ventilated seat 20 includes the back jounce zone 108 and the seat jounce zone 110. The back jounce zone 108 may include and be located behind part or all of the porous back cover portion 42. However, the back jounce zone 108 may not extend in front of the back frame portion 34. The seat jounce zone 110 may include and be located under all or part of the porous seat cover portion 36. The seat jounce zone 110 may extend beyond the porous seat cover portion 36. However, the seat jounce zone 110 may not extend above the seat frame portion 32. The back jounce zone 108 may be the part of the back portion 28 where the surface 71 of the back portion 28 deforms rearward, in the back jounce zone deformation direction (arrow BJD), 12 mm or more during the dynamic force (arrow F), when the dynamic force (arrow F) is severe. The seat jounce zone 110 may be the part of the seat portion 26 where the surface 91 of the seat portion 26 deforms downward, in the seat jounce zone deformation direction (arrow SJD), 12 mm or more during the dynamic force (arrow F), when the dynamic force (arrow F) is severe.

An outer boundary 112 of the back jounce zone 108 may be located at or within an outer boundary 114 of the porous back cover portion 42. The outer boundary 112 of the back jounce zone 108 may be located at or within an inner boundary of the back frame portion 34. The outer boundary 112 of the back jounce zone 108 may be located where the surface 71 of the back portion 28 deforms rearward 12 mm during the dynamic force (arrow F), when the dynamic force (arrow F) is severe. An outer boundary 116 of the seat jounce zone 110 may be located at or within an outer boundary 118 of the porous seat cover portion 36. The outer boundary 116 of the seat jounce zone 110 may be located at or within an inner boundary of the seat frame portion 32. The outer boundary 116 of the seat jounce zone 110 may be located where the surface 91 of the seat portion 26 deforms downward 12 mm during the dynamic force (arrow F), when the dynamic force (arrow F) is severe.

The cylindrical blower 30 is disposed at least partially outside of the jounce zone 22 of the ventilated seat 20. Alternatively, the cylindrical blower 30 may be disposed fully outside of the jounce zone 22 of the ventilated seat 20. At least one quarter of the cylindrical blower 30 may be disposed under the seat frame portion 32 or behind the back frame portion 34 of the frame 24. Alternatively, at least one half of the cylindrical blower 30 may be disposed under the seat frame portion 32 or behind the back frame portion 34 of the frame 24. The cylindrical blower 30 may be disposed partially or fully under the seat bolster portion 41 of the ventilated seat 20. The cylindrical blower 30 may be disposed partially or fully behind the back bolster portion 45 of the ventilated seat 20.

The cylindrical blower 30 may be disposed in one of the cavity 69 of the back portion 28 and the cavity 89 of the seat portion at least partially outside of the jounce zone 22. The cylindrical blower 30 may be disposed in one of at least four alternative positions in the ventilated seat 20. In FIGS. 1, 2, and 3, the cylindrical blower 30 is show in a first position 31. In FIG. 2, the cylindrical blower 30 is also shown in a second portion 33, which could be on either side of the ventilated seat 20. In FIGS. 1, 4, and 6, the cylindrical blower 30 is shown in a third position 35. In FIGS. 4 and 5, the cylindrical blower 30 is shown in a fourth position 37, which could be on either side of the ventilated seat 20. The cylindrical blower 30 could be disposed in other positions, as appropriate.

The seat portion 26 and the back portion 28 of the ventilated seat 20 may not come into contact with the cylindrical blower 30 when the jounce zone 22 deforms. The cylindrical blower 30 may not move relative to the frame 24 when the jounce zone 22 deforms. The seat suspension 82 and the back suspension 58 may not come into contact with the cylindrical blower 30 when they move relative to the frame 24 when the jounce zone 22 deforms.

Referring again to FIGS. 2 and 3, the cylindrical blower 30 includes an impeller 92 having an axis of rotation 94 and a housing 96 having an intake port 98 and an exhaust port 100. The cylindrical blower 30 has a length 102 parallel to the axis of rotation 94 of the impeller 92 and a diameter 104 perpendicular to the axis of rotation 94 of the impeller 92. The length 102 of the cylindrical blower 30 may be at least twice the diameter 104 of the cylindrical blower 30. Alternatively, the length 102 of the cylindrical blower 30 may be at least four times the diameter 104 of the cylindrical blower 30. In other embodiments, the length 102 of the cylindrical blower 30 may be at least six or eight times the diameter 104 of the cylindrical blower 30.

The impeller 92 of the cylindrical blower 30 may be one of a centrifugal fan impeller, as shown, a brush impeller (not shown), similar to a vacuum cleaner beater bar, a scroll impeller (not shown), a twin roots type impeller (not shown), and a twin screw impeller (not shown), as understood by those skilled in the art. Any other suitable fan, blower, or compressor impeller may be used as appropriate. The cylindrical blower 30 may be a roots blower (not shown), having a pair of closely fitting, meshing, lobed cylinders in a closely fitting housing, or any other suitable fan, blower, or compressor, as understood by those skilled in the art. The cylindrical blower 30 may have a cross-section in a plane normal to the axis of rotation 94. A periphery of the cross-section of the cylindrical blower 30 may be one of a round, an oval, and an oblong shape.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A ventilated seat having a jounce zone including a seat jounce zone and a back jounce zone, the jounce zones configured to deform when the ventilated seat and an occupant are subjected to a dynamic force, the ventilated seat comprising:
   a frame;
   a seat portion connected to the frame and having a porous seat cover portion, a seat suspension, and the seat jounce zone having an outer boundary;
   a back portion connected to the frame and having a porous back cover portion, a back suspension, and the back jounce zone having an outer boundary; and
   a cylindrical blower including an impeller having an axis of rotation, having a length parallel to the axis of rotation and a diameter perpendicular to the axis of rotation, attached to the frame, disposed at least partially outside of the outer boundaries of the seat and the back jounce zones, and operatively connected to one of the porous seat cover portion and the porous back cover portion such that air flows through the respective porous cover portion to provide ventilation to the ventilated seat;
   wherein the length of the cylindrical blower is at least four times the diameter of the cylindrical blower.

2. The ventilated seat of claim 1, wherein the cylindrical blower is disposed fully outside of the outer boundaries of the seat and the back jounce zones.

3. The ventilated seat of claim 1, wherein the seat and back suspensions do not contact the cylindrical blower when the jounce zone deforms.

4. The ventilated seat of claim 1, wherein the cylindrical blower does not move relative to the frame when the jounce zone deforms.

5. The ventilated seat of claim 1, wherein the frame has a seat frame portion and a back frame portion; and
   wherein at least one quarter of the cylindrical blower is disposed under the seat frame portion or behind the back frame portion of the frame.

6. The ventilated seat of claim 1, wherein the frame has a seat frame portion and a back frame portion; and
   wherein at least one half of the cylindrical blower is disposed under the seat frame portion or behind the back frame portion of the frame.

7. The ventilated seat of claim 1, wherein the seat suspension is configured to move relative to the frame when the jounce zone deforms;
   wherein the back suspension is configured to move relative to the frame when the jounce zone deforms;
   wherein the cylindrical blower is not attached to the seat suspension or the back suspension.

8. The ventilated seat of claim 7, wherein the cylindrical blower does not move relative to the frame when the jounce zone deforms.

9. The ventilated seat of claim 8, wherein seat and back suspensions do not contact the cylindrical blower when they move relative to the frame when the jounce zone deforms.

10. The ventilated seat of claim 1, wherein one of the seat portion and the back portion forms a cavity at least partially outside of the jounce zone; and
    wherein the cylindrical blower is disposed in the cavity.

11. The ventilated seat of claim 1, wherein the cylindrical blower is attached to the frame via an isolator.

12. A vehicle subjectable to a dynamic force, comprising:
    a body; and
    a ventilated seat having a jounce zone including a seat jounce zone and a back jounce zone, the jounce zones configured to deform when an occupant is in the ventilated seat and the vehicle is subjected to the dynamic force, the ventilated seat operatively connected to the body and including:
       a frame;
       a seat portion connected to the frame and having a porous seat cover portion, a seat suspension, and the seat jounce zone having an outer boundary;

a back portion connected to the frame and having a porous back cover portion, a back suspension, and the back jounce zone having an outer boundary; and a cylindrical blower including an impeller having an axis of rotation, having a length parallel to the axis of rotation and a diameter perpendicular to the axis of rotation, attached to the frame, disposed at least partially outside of the outer boundaries of the seat and the back jounce zones, and operatively connected to one of the porous seat cover portion and the porous back cover portion such that air flows through the respective porous cover portion to provide ventilation to the ventilated seat;

wherein the length of the cylindrical blower is at least four times the diameter of the cylindrical blower.

13. The vehicle of claim 12, wherein the cylindrical blower is disposed fully outside of the outer boundaries of the seat and the back jounce zones.

14. The vehicle of claim 12, wherein the seat and back suspensions do not contact the cylindrical blower when the jounce zone deforms.

15. The vehicle of claim 12, wherein the cylindrical blower does not move relative to the frame when the jounce zone deforms.

16. The vehicle of claim 12, wherein the jounce zone is further configured to deform when an occupant moves in the ventilated seat.

17. The vehicle of claim 12, wherein the frame has a seat frame portion and a back frame portion; and wherein at least one quarter of the cylindrical blower is disposed under the seat frame portion or behind the back frame portion of the frame.

* * * * *